United States Patent
Kanzawa et al.

(10) Patent No.: US 9,485,378 B2
(45) Date of Patent: Nov. 1, 2016

(54) IMAGE FORMING APPARATUS, POWER-SAVING STATE CONTROL METHOD, AND PROGRAM

(71) Applicant: KONICA MINOLTA, INC., Chiyoda-ku, Tokyo (JP)

(72) Inventors: Motoki Kanzawa, Hachioji (JP); Takeo Katsuda, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/972,581

(22) Filed: Dec. 17, 2015

(65) Prior Publication Data

US 2016/0191739 A1 Jun. 30, 2016

(30) Foreign Application Priority Data

Dec. 25, 2014 (JP) ................................. 2014-261528

(51) Int. Cl.
*H04N 1/00* (2006.01)
*G06K 9/00* (2006.01)

(52) U.S. Cl.
CPC ...... *H04N 1/00896* (2013.01); *G06K 9/00362* (2013.01)

(58) Field of Classification Search
CPC ....................... H04N 1/00896; G06K 9/00362
USPC ....................................................... 358/1.13
See application file for complete search history.

(56) References Cited

U.S. PATENT DOCUMENTS

| | | | | |
|---|---|---|---|---|
| 5,822,077 | A * | 10/1998 | Sasaki | H04N 1/00885 340/435 |
| 9,065,955 | B2 * | 6/2015 | Baba | H04N 1/00323 |
| 2013/0300198 | A1* | 11/2013 | Yamashina | H02J 9/005 307/39 |
| 2015/0264209 | A1* | 9/2015 | Shiraishi | H04N 1/00896 358/1.15 |

FOREIGN PATENT DOCUMENTS

JP 2014-098894 A 5/2014

* cited by examiner

*Primary Examiner* — Allen H Nguyen
(74) *Attorney, Agent, or Firm* — Buchanan Ingersoll & Rooney PC

(57) ABSTRACT

An image forming apparatus includes: a sensing unit configured to sense a user and an obstacle blocking the user's passage, and measure positions of the sensed user and the sensed obstacle; a power-saving state canceling unit configured to cancel a power saving state when the sensing unit senses entrance of a user into a power-saving state canceling area, the power-saving state canceling area causing cancellation of the power saving state when a user enters the power-saving state canceling area; a first determining unit configured to determine whether a power-saving state cancellation avoiding area not causing cancellation of the power saving state is necessary in the power-saving state canceling area when the obstacle is sensed by the sensing unit; and a creating unit configured to create the power-saving state cancellation avoiding area when the first determining unit determines that the power-saving state cancellation avoiding area is necessary.

11 Claims, 14 Drawing Sheets

IMAGE FORMING APPARATUS, POWER-SAVING STATE CONTROL METHOD, AND PROGRAM

The entire disclosure of Japanese Patent Application No. 2014-261528 filed on Dec. 25, 2014 including description, claims, drawings, and abstract are incorporated herein by reference in its entirety.

BACKGROUND OF THE INVENTION

1. Field of the Invention

The present invention relates to an image forming apparatus, a power-saving state control method, and a program.

2. Description of the Related Art

When a user uses a conventional image forming apparatus in a power saving state, the user needs to stand by after performing a predetermined operation to cancel the power saving state on the image forming apparatus until the power saving state is actually canceled.

To counter this problem, there is a suggested technology by which a sensor that senses the existence of a user in advance is provided, and activation is started before the arrival of the user, so as to shorten the standby time.

For example, JP 2014-98894 A discloses a technology by which a sensing unit that has an imaging function is at least provided, and sensing units that have different power consumptions during operation and different operating specifications from one another are used.

By the technology disclosed in JP 2014-98894 A, however, when a user not using the image forming apparatus passes nearby, there might not be any region where the user can avoid the sensing area of the sensor due to an obstacle such as a wall depending on the installation location of the image forming apparatus. In this case, the user cannot help but enter the sensing area of the sensor. Therefore, the power saving state is canceled, and electric power is unnecessarily consumed. As a result, energy saving is hindered.

SUMMARY OF THE INVENTION

An object of the present invention is to provide an image forming apparatus, a power-saving state control method, and a program that can realize energy saving by restricting unintended cancellation of a power saving state, regardless of the installation location of the image forming apparatus.

To achieve the abovementioned object, according to an aspect, an image forming apparatus reflecting one aspect of the present invention comprises: a sensing unit that senses a user and an obstacle that blocks the user's passage, and measures the positions of the sensed user and the sensed obstacle; a power-saving state canceling unit that cancels a power saving state when the sensing unit senses entrance of a user into a power-saving state canceling area, the power-saving state canceling area causing cancellation of the power saving state when a user enters the power-saving state canceling area; a first determining unit that determines whether a power-saving state cancellation avoiding area not causing cancellation of the power saving state is necessary in the power-saving state canceling area based on an obstacle's position measured by the sensing unit when the obstacle is sensed by the sensing unit; and a creating unit that creates the power-saving state cancellation avoiding area when the first determining unit determines that the power-saving state cancellation avoiding area is necessary.

According to an invention of Item. 2, the image forming apparatus of Item. 1 preferably further includes: an irradiating unit that emits light; and an irradiation control unit that causes the irradiating unit to irradiate the power-saving state canceling area when the sensing unit senses entrance of a user into a human sensing area, the human sensing area causing sensing of a user, wherein the irradiation control unit preferably causes the irradiating unit to irradiate the power-saving state canceling area minus the power-saving state cancellation avoiding area.

According to an invention of Item. 3, the image forming apparatus of Item. 1 or 2 preferably further includes: an acquiring unit that acquires a user's moving route based on the user's position continuously measured by the sensing unit when the user is sensed by the sensing unit; a second determining unit that determines whether it is necessary to change the power-saving state cancellation avoiding area based on the moving route acquired by the acquiring unit; and a first changing unit that changes the power-saving state cancellation avoiding area when the second determining unit determines that it is necessary to change the power-saving state cancellation avoiding area.

According to an invention of Item. 4, in the image forming apparatus of Item. 3, the first changing unit preferably changes the power-saving state cancellation avoiding area so as to include all the area on the side farther from the apparatus than a line extended from the user's moving route.

According to an invention of Item. 5, the image forming apparatus of Item. 4 preferably further includes a third determining unit that determines whether another user is moving toward the apparatus based on the other user's moving route acquired by the acquiring unit when the other user is sensed by the sensing unit, wherein, when the third determining unit determines that the other user is moving toward the apparatus, the first changing unit preferably changes the power-saving state cancellation avoiding area to an area formed only along the line extended from the user's moving route.

According to an invention of Item. 6, the image forming apparatus of Item. 1 or 2 preferably further includes a second changing unit that changes the power-saving state cancellation avoiding area to a wider area when the sensing unit senses another user after sensing the user in the power-saving state cancellation avoiding area created by the creating unit.

According to an invention of Item. 7, in the image forming apparatus of Item. 1 or 2, the sensing unit preferably senses another image forming apparatus, and measures the position of the sensed other image forming apparatus, a communication unit is preferably further provided to transmit information about the position of the apparatus to the other image forming apparatus, and receive information about the positions of the human sensing area and the power-saving state canceling area transmitted from the other image forming apparatus, the first determining unit preferably determines whether the power-saving state cancellation avoiding area is necessary in the power-saving state canceling area of the apparatus based on the information about the position of the power-saving state canceling area of the other image information apparatus, the information having been received by the communication unit, and the communication unit preferably transmits information about the position of the power-saving state cancellation avoiding area created by the creating unit to the another image forming apparatus.

According to an invention of Item. 8, the image forming apparatus of Item. 7 preferably further includes: an acquiring unit that acquires a user's moving route based on the user's position continuously measured by the sensing unit when the user is sensed by the sensing unit; a second determining unit that determines whether it is necessary to change the power-saving state cancellation avoiding area based on the moving route acquired by the acquiring unit; and a first changing unit that changes the power-saving state cancellation avoiding area when the second determining unit determines that it is necessary to change the power-saving state cancellation avoiding area, wherein the communication unit preferably transmits information about the position of the power-saving state cancellation avoiding area changed by the first changing unit to the other image forming apparatus.

According to an invention of Item. 9, the image forming apparatus of Item. 7 preferably further includes a fourth determining unit that determines whether an area allowing a user to pass therethrough exists in an area that is included in the human sensing area of the apparatus but is not included in the power-saving state canceling area of the other image forming apparatus, wherein, when the fourth determining unit determines that there exists an area allowing a user to pass therethrough, the creating unit preferably creates the power-saving state cancellation avoiding area in the power-saving state canceling area of the apparatus.

To achieve the abovementioned object, according to an aspect, a power-saving state control method for an image forming apparatus reflecting one aspect of the present invention comprises: the step of canceling a power saving state when a sensing unit senses entrance of a user into a power-saving state canceling area, the sensing unit sensing a user and an obstacle that blocks the user's passage, the sensing unit measuring the positions of the sensed user and the sensed obstacle, the power-saving state canceling area causing cancellation of the power saving state when a user enters the power-saving state canceling area; the step of determining whether a power-saving state cancellation avoiding area not causing cancellation of the power saving state is necessary in the power-saving state canceling area based on an obstacle's position measured by the sensing unit when the obstacle is sensed by the sensing unit; and the step of creating the power-saving state cancellation avoiding area when the power-saving state cancellation avoiding area is determined to be necessary.

To achieve the abovementioned object, according to an aspect, a non-transitory recording medium storing a computer readable program reflecting one aspect of the present invention causes a computer to function as: a power-saving state canceling unit that cancels a power saving state when entrance of a user into a power-saving state canceling area is sensed by a sensing unit, the sensing unit sensing a user and an obstacle that blocks the user's passage, the sensing unit measuring the positions of the sensed user and the sensed obstacle, the power-saving state canceling area causing cancellation of the power saving state when a user enters the power-saving state canceling area; a first determining unit that determines whether a power-saving state cancellation avoiding area not causing cancellation of the power saving state is necessary in the power-saving state canceling area based on an obstacle's position measured by the sensing unit when the obstacle is sensed by the sensing unit; and a creating unit that creates the power-saving state cancellation avoiding area when the first determining unit determines that the power-saving state cancellation avoiding area is necessary.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is a flowchart showing the process to be performed when the image forming apparatus according to the embodiment is powered on;

FIG. 12 is a flowchart showing the process to be performed when an image forming apparatus according to a fourth modification is powered on;

DESCRIPTION OF THE PREFERRED EMBODIMENTS

Hereinafter, an embodiment of the present invention will be described in detail with reference to the drawings. However, the scope of the invention is not limited to the illustrated examples.

Figure 1:
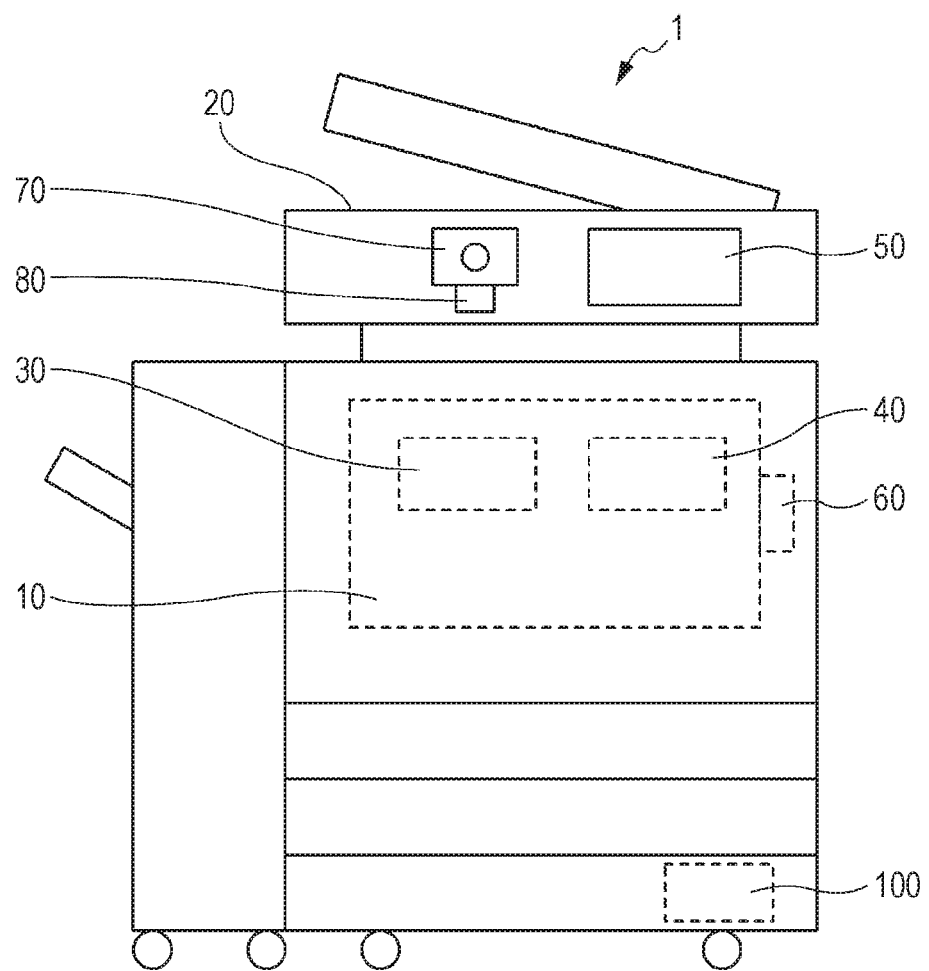
FIG. 1 is a diagram schematically showing the structure of an image forming apparatus according to an embodiment.
Figure 2:
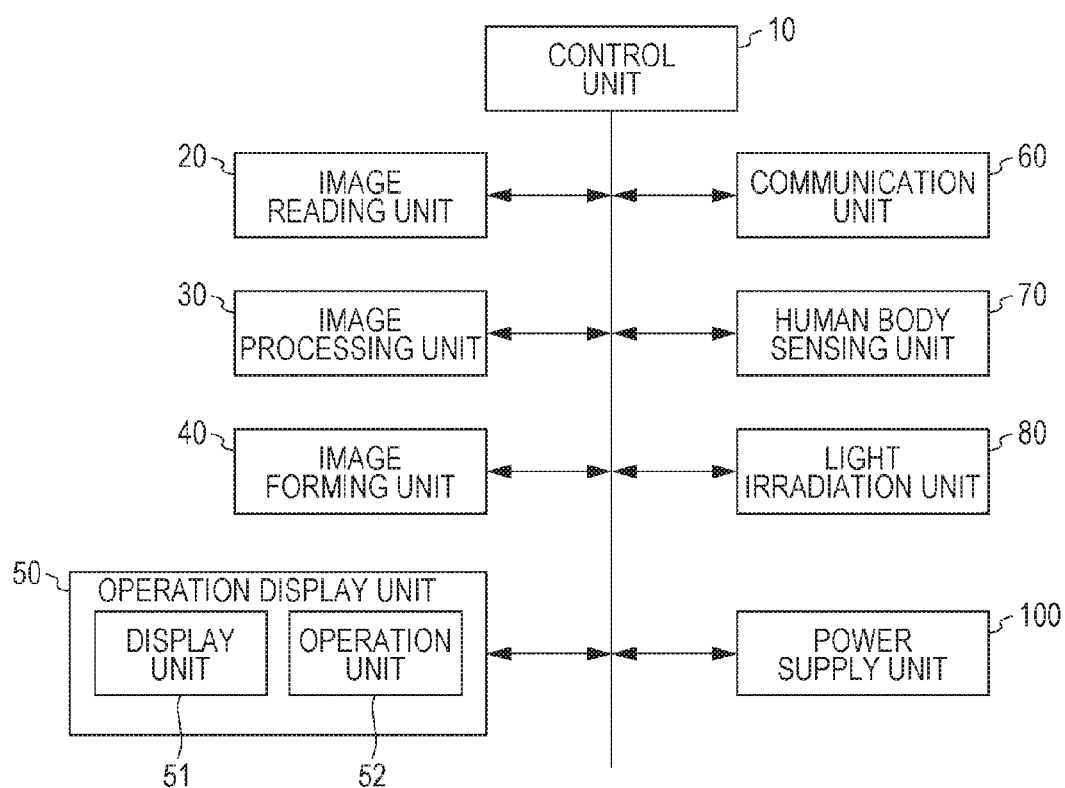
FIG. 2 is a block diagram showing the control structure of the image forming apparatus according to the embodiment.

As shown in FIGS. 1 and 2, an image forming apparatus 1 according to this embodiment includes a control unit 10, an image reading unit 20, an image processing unit 30, an image forming unit 40, an operation display unit 50, a communication unit 60, a human body sensing unit 70, a light irradiation unit 80, and a power supply unit 100, which are connected to one another via a bus.

The control unit 10 includes a CPU, a ROM, a RAM, and the like. The CPU of the control unit 10 reads a system program and various processing programs stored in the ROM, and loads the programs into the RAM. In accordance with the loaded programs, the CPU performs central control on operation of each of the components of the image forming apparatus 1.

The image reading unit 20 includes a light source, a CCD (Charge Coupled Device) image sensor, an A/D converter, and the like. The image reading unit 20 reads an image of an original by photoelectrically converting an image formed with reflected light of the light that has been emitted from the light source to the original for scanning. The image reading unit 20 performs A/D conversion on the read image, and outputs the obtained image data to the image processing unit 30.

The image processing unit 30 performs shading correction, color conversion, tone correction, a tone reproduction process (screen processing or an error diffusion process), and the like on input image data (color density gradation data) that is input via the image reading unit 20, the communication unit 60, or the like, and outputs the resultant image data to the image forming unit 40.

The image forming unit 40 performs image formation on a recording medium such as a recording paper sheet based on the image data that is input from the image processing unit 30. The technique used by the image forming unit 40 for forming an image may be any appropriate known technique, such as an electrophotographic technique, an ink jet technique, or a thermal transfer technique.

The operation display unit 50 includes a display unit 51 and an operation unit 52.

The display unit 51 is formed with an LCD (Liquid Crystal Display) or the like, and displays the respective kinds of operation buttons, the state of the apparatus, the operational states of the respective functions, and the like on the display screen in accordance with a display signal that is input from the control unit 10.

The operation unit 52 includes various kinds of operation keys such as a numeric keypad and a start key, to receive a key operation from a user and output an operating signal to the control unit 10. The operation unit 52 has a pressure-sensitive (or resistive) touch panel formed by arranging transparent electrodes in a grid array so as to cover the upper surface of the LCD of the display unit 51. The operation unit 52 detects the X-Y coordinates of the point pressed with a finger, a touch-pen, or the like in the form of a voltage value, and outputs the detected positional signal as an operating signal to the control unit 10. The touch panel is not limited to a pressure-sensitive one, but may be of another electrostatic type or an optical type.

The communication unit 60 is formed with a modem, a LAN adapter, a router, or the like. The control unit 60 controls communication with an external device such as a PC (Personal Computer) connected to a communication network such as a LAN (Local Area Network) or a WAN (Wide Area Network), and receives image data and the like.

The human body sensing unit (the sensor unit) 70 is formed with a depth sensor. The human body sensing unit 70 irradiates an object with a special pattern formed with infrared rays, and measures the position (depth) of the object in a predetermined area (hereinafter referred to as the human sensing area E1) based on information obtained from an image of the pattern captured by a camera. Specifically, the human body sensing unit 70 senses a user existing in the human sensing area E1, and measures the position of the sensed user. The human body sensing unit 70 also senses an obstacle such as a wall existing in the human sensing area E1, and measures the position of the sensed obstacle. The human body sensing unit 70 may be a known sensor such as Kinect (a registered trade name), for example.

Figure 3:
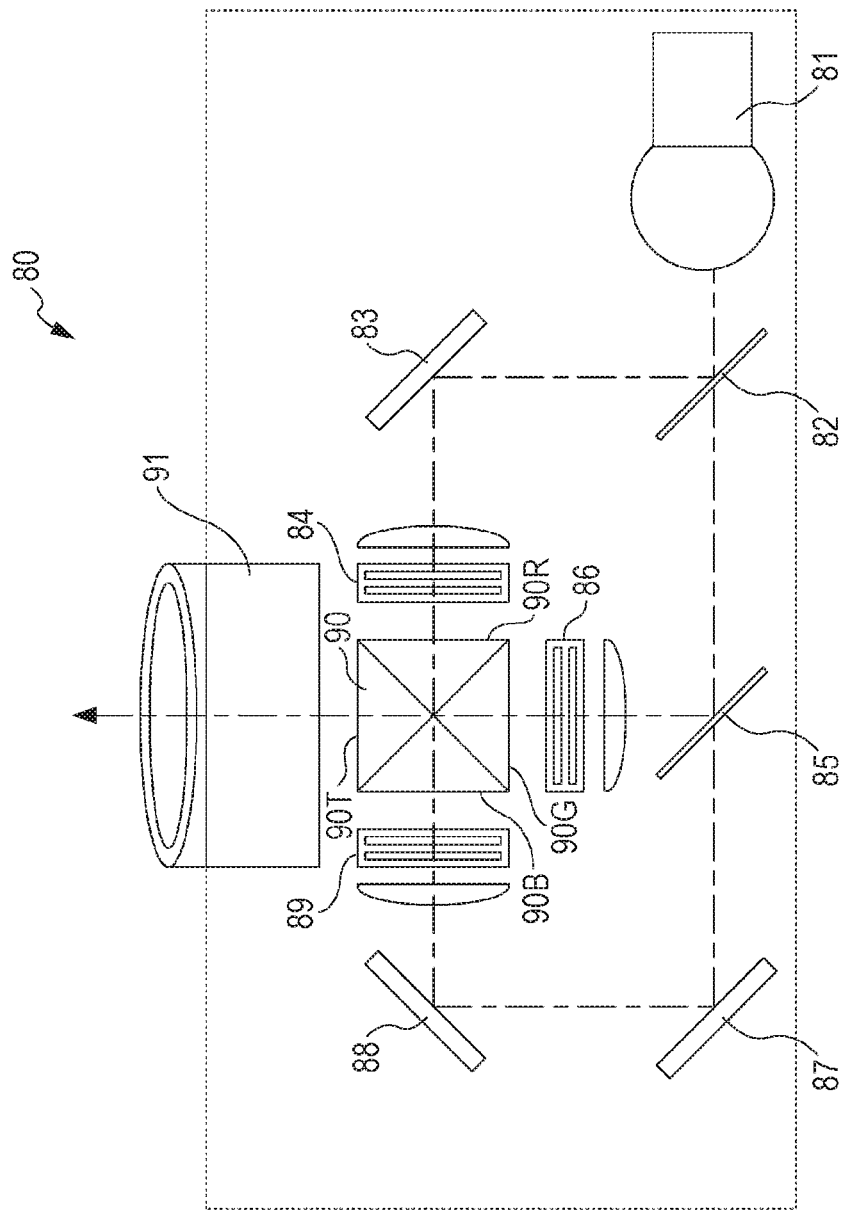
FIG. 3 is a diagram schematically showing the structure of a light irradiation unit.

The light irradiation unit (the irradiating unit) 80 is a device of a three-plate type that displays a color image using three transmissive liquid crystal panels, and irradiates a predetermined area (hereinafter referred to as the power-saving state canceling area E2) outside the image forming apparatus 1 with a color image indicating that the current area is the power-saving state canceling area E2. As shown in FIG. 3, the light irradiation unit 80 includes a light source 81, a first dichroic mirror 82, a first reflecting mirror 83, a first liquid crystal panel 84, a second dichroic mirror 85, a second liquid crystal panel 86, a second reflecting mirror 87, a third reflecting mirror 88, a third liquid crystal panel 89, a cross dichroic prism 90, and a projecting lens 91.

The light source 81 is formed with an ultrahigh-pressure mercury lamp, for example, and emits white light containing red light, green light, and blue light, which are the three primary colors of light and are required in forming a color image with light.

The first dichroic mirror 82 separates the light emitted from the light source 81 into red light to be reflected, and the light in the other colors to be allowed to pass or green light and blue light.

The first reflecting mirror 83 reflects the red light separated by the first dichroic mirror 82 toward the first liquid crystal panel 84.

The first liquid crystal panel 84 spatially modulates the red light reflected by the first reflecting mirror 83 in accordance with the image signal corresponding to red-color image information.

The second dichroic mirror 85 separates the light that has passed through the first dichroic mirror 82 into green light, and the light in the other color or blue light.

The second liquid crystal panel 86 spatially modulates the green light separated by the second dichroic mirror 85 in accordance with the image signal corresponding to green-color image information.

The second reflecting mirror 87 reflects the blue light that has passed through the second dichroic mirror 85 toward the third reflecting mirror 88.

The third reflecting mirror 88 reflects the blue light reflected by the second reflecting mirror 87 toward the third liquid crystal panel 89.

The third liquid crystal panel 89 spatially modulates the blue light reflected by the third reflecting mirror 88 in accordance with the image signal corresponding to blue-color image information.

The cross dichroic prism 90 includes three entrance planes 90R, 90G, and 90B, and one exit plane 90T. The cross dichroic prism 90 is designed so that the red light exiting from the first liquid crystal panel 84 enters the entrance plane 90R, the green light exiting from the second liquid crystal panel 86 enters the entrance plane 90G, and the blue light exiting from the third liquid crystal panel 89 enters the entrance plane 90B. The cross dichroic prism 90 combines the red light, the green light, and the blue light that have entered the entrance planes 90R, 90G, and 90B, and outputs the combined light from the exit plane 90T.

The projecting lens 91 enlarges the combined light exiting from the exit plane 90T of the cross dichroic prism 90, and releases the enlarged light to the outside of the image forming apparatus 1.

Figure 5A:
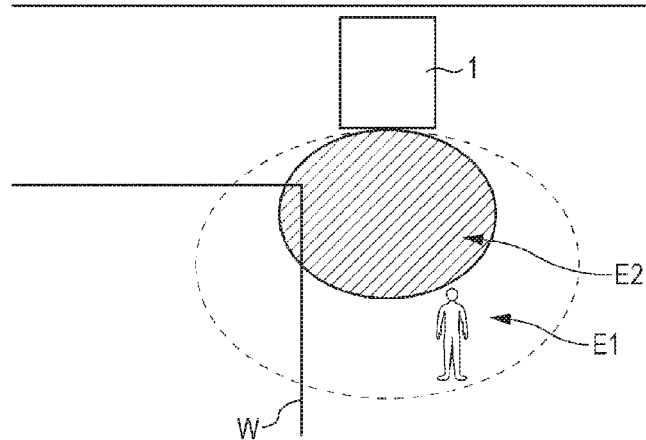
FIGS. 5A through 5C are diagrams showing an example where a power-saving state cancellation avoiding area is created along an obstacle.

In a case where entrance of a user into the human sensing area E1 is sensed by the human body sensing unit 70, the control unit 10 causes the light irradiation unit 80 to irradiate the power-saving state canceling area E2 with a color image indicating that the current area is the power-saving state canceling area E2 (see FIG. 5 and others). That is, the control unit 10 functions as the irradiation control unit according to an embodiment of the present invention.

In a case where entrance of a user into the power-saving state canceling area E2 is sensed by the human body sensing unit 70, the control unit 10 cancels the power-saving state. That is, the control unit 10 functions as the power-saving state canceling unit according to an embodiment of the present invention.

The power supply unit 100 receives a supply of power from a commercial power source (not shown). The power supply unit 100 supplies power to the control unit 10, and also supplies power to the image reading unit 20, the image processing unit 30, the image forming unit 40, the operation display unit 50, the communication unit 60, the human body sensing unit 70, and the light irradiation unit 80 via power supply lines independently of one another. Accordingly, the control unit 10 supplies power or cuts off the power supplies to the respective components independently of one another. By doing so, the control unit 10 can perform so-called partial power saving control.

In this embodiment, in a case where the image forming apparatus 1 is not used for a predetermined period of time, the image forming apparatus 1 enters a power saving mode in which the power supplies are cut off, except for the power supplies for predetermined components. In the power saving mode, the power supply unit 100 supplies power at least to the human body sensing unit 70 that senses entrance of a user into the human sensing area E1, and the light irradiation unit 80 that irradiates the power-saving state canceling area E2 with a color image when entrance of a user is sensed by the human body sensing unit 70.

When not in the power saving mode, the power supply unit 100 cuts off the power supplies to the human body sensing unit 70 and the light irradiation unit 80. However, when not in the power saving mode, the power supply unit 100 may also supply power to the human body sensing unit 70 and the light irradiation unit 80.

Figure 4:
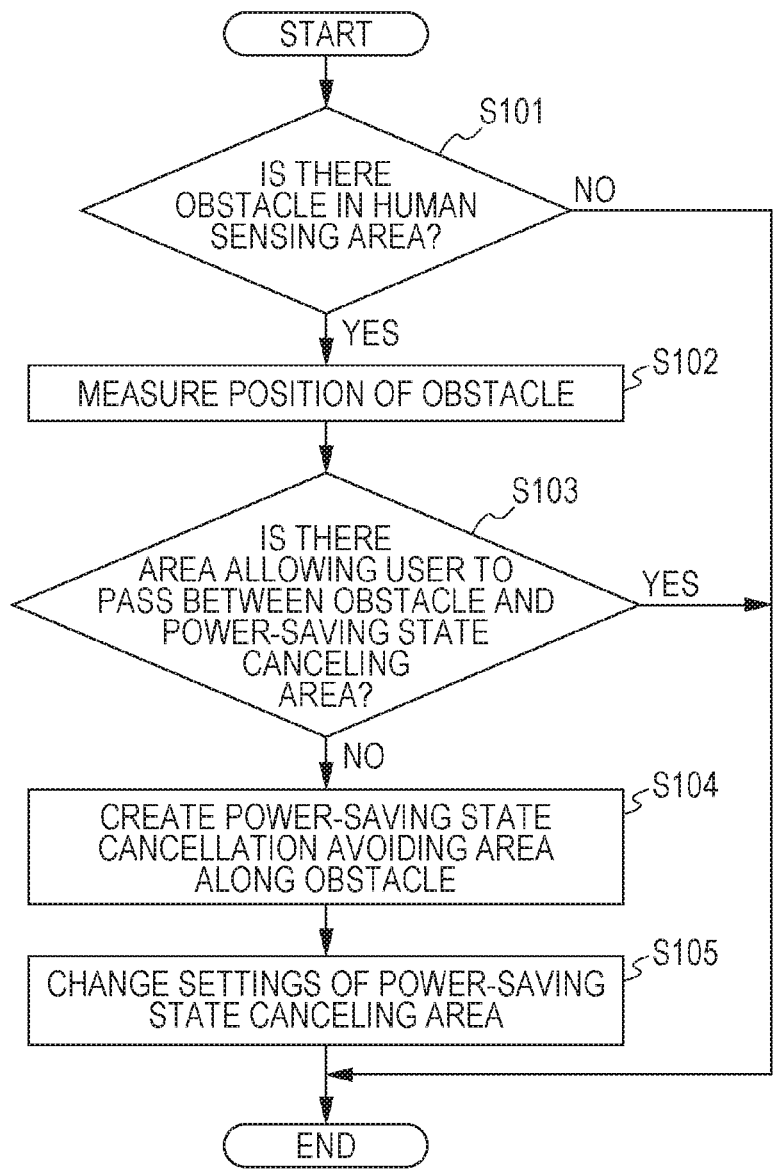

Referring now to FIGS. 4 and 5, the process to be performed when the image forming apparatus 1 according to this embodiment is powered on is described. This process is started when a user inputs an instruction to supply power via the operation display unit 50.

In this embodiment, an example case where a wall W (see FIG. 5A) exists in the power-saving state canceling area E2 of the image forming apparatus 1 is described.

Figure 5B:
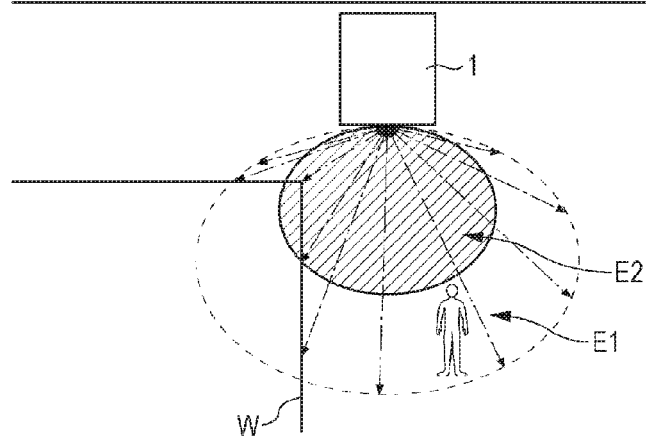

First, the control unit 10 controls the human body sensing unit 70 to determine whether an obstacle exists in the human sensing area E1 of the image forming apparatus 1 (step S101). Here, an obstacle is an object that blocks a user's passage, and may be a wall, for example. In this embodiment, the wall W that blocks a user's passage exists in the human sensing area E1 as shown in FIG. 5B, and therefore, it is determined that there exists an obstacle.

If it is determined that there exists an obstacle (step S101: YES), the process moves on to the next step S102.

If it is determined that there are no obstacles (step S101: NO), on the other hand, the process comes to an end.

The control unit 10 then controls the human body sensing unit 70 to measure the position of the obstacle (step S102).

Based on the position of the obstacle measured in step S102, the control unit 10 determines whether there is an area through which a user can pass between the obstacle and the power-saving state canceling area E2 (step S103). In the example illustrated in FIGS. 5A through 5C, the wall W that blocks a user's passage exists in the power-saving state canceling area E2, and therefore, it is determined that there is not an area through which a user can pass.

If it is determined that there is an area through which a user can pass (step S103: YES), the process comes to an end.

If it is determined that there is not an area through which a user can pass (step S103: NO), it is determined that there is the need to create an area in which the power saving state (power saving mode) is not canceled (the area will be hereinafter referred to as the power-saving state cancellation avoiding area E31) even when the user enters the area, and the process moves on to the next step S104.

That is, the control unit 10 functions as the first determining unit according to an embodiment of the present invention.

Figure 5C:
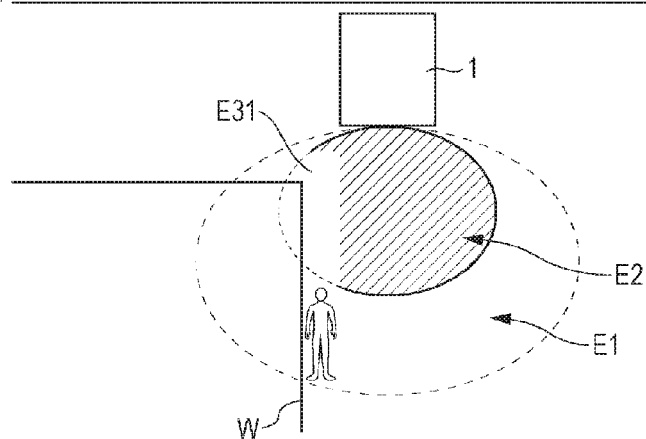

The control unit 10 then creates a power-saving state cancellation avoiding area E31 along the obstacle (step S104). As shown in FIG. 5C, the power-saving state cancellation avoiding area E31 is created along the obstacle (wall W), and has such a width as to allow a user to pass therethrough.

That is, the control unit 10 functions as the creating unit according to an embodiment of the present invention.

Based on the power-saving state cancellation avoiding area E31 created in step S104, the control unit 10 changes the settings of the power-saving state canceling area E2 (step S105).

Figure 6:
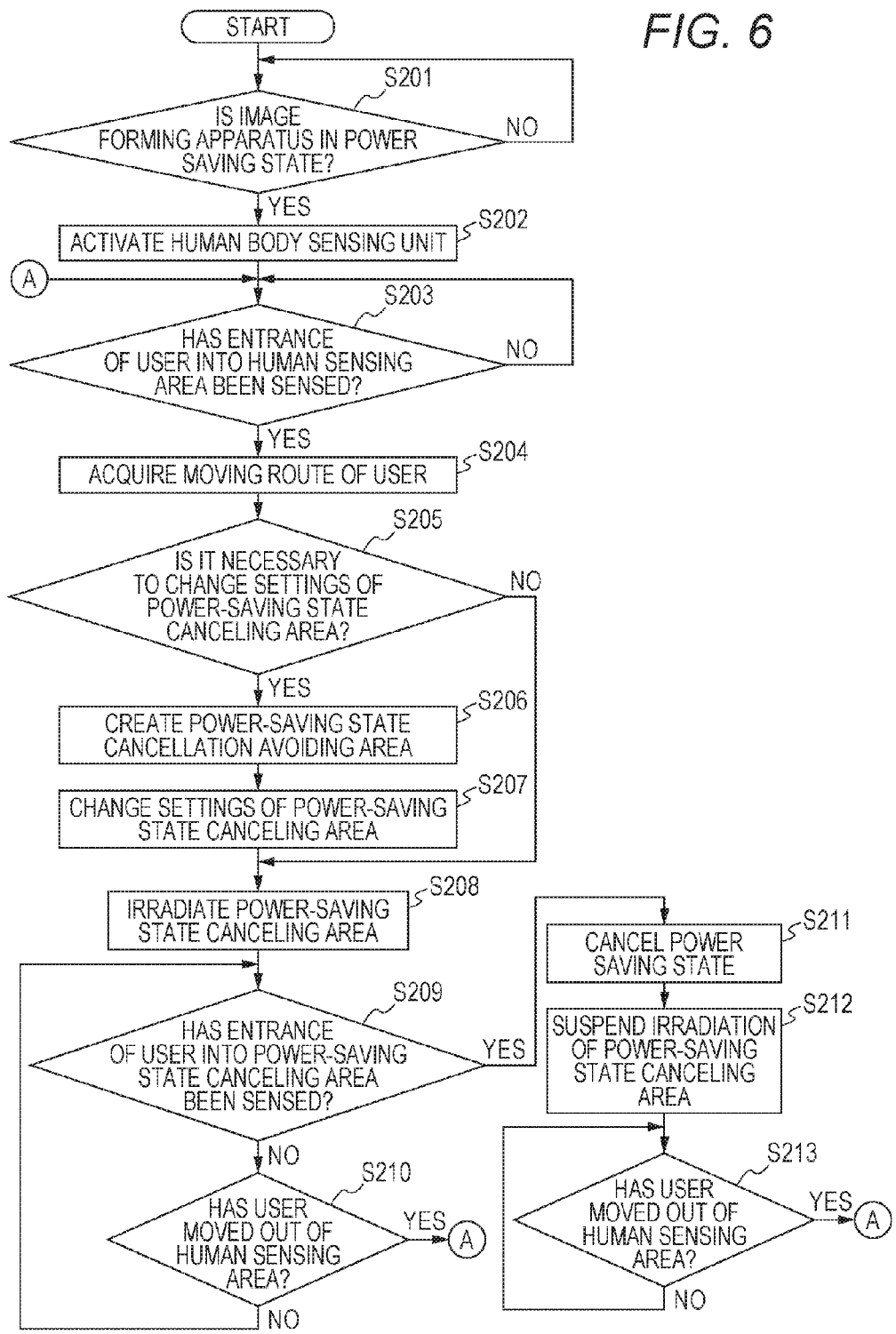
FIG. 6 is a flowchart showing the process to be performed when the image forming apparatus according to the embodiment is actually activated.
Figure 7A:
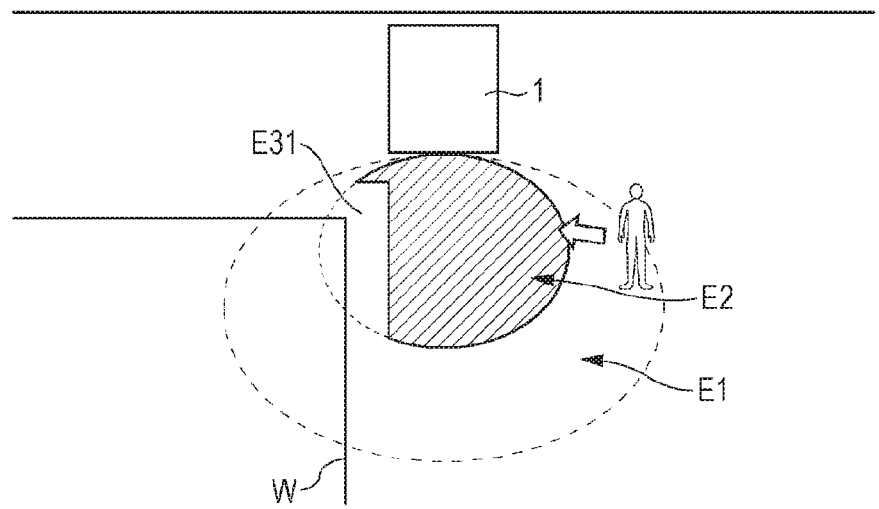
FIGS. 7A and 7B are diagrams showing an example where a power-saving state cancellation avoiding area is created on a user's moving route.

Referring now to FIGS. 6 and 7, the process to be performed when the image forming apparatus 1 according to this embodiment is actually activated is described.

First, the control unit 10 determines whether the image forming apparatus 1 is in a power saving state (step S201).

If the image forming apparatus 1 is determined to be in a power saving state (step S201: YES), the process moves on to the next step S202.

If the image forming apparatus 1 is determined not to be in a power saving state (step S201: NO), the procedure of step S201 is repeated until the image forming apparatus 1 is determined to be in a power saving state.

The control unit 10 then activates the human body sensing unit 70 that has its power supply cut off when not in a power saving state (step S202). At the same time, the control unit 10 may also activate the light irradiation unit 80 that has its power supply cut off when not in a power saving state.

The control unit 10 then determines whether entrance of a user into the human sensing area E1 has been sensed by the human body sensing unit 70 activated in step S202 (step S203).

If the control unit 10 determines that entrance of a user has been sensed (step S203: YES), the process moves on to the next step S204.

If the control unit 10 determines that entrance of any user has not been sensed (step S203: NO), the procedure of step S203 is repeated until the control unit 10 determines that entrance of a user has been sensed.

The control unit 10 then acquires the moving route of the user whose entrance has been sensed in step S203 (step S204). Specifically, the control unit 10 acquires the moving route of the user based on the user's position continuously measured by the human body sensing unit 70.

That is, the control unit 10 functions as the acquiring unit according to an embodiment of the present invention.

Based on the user's moving route acquired in step S204, the control unit 10 determines whether it is necessary to change the settings of the power-saving state canceling area E2, or to change the power-saving state cancellation avoiding area E31 (step S205). Specifically, in a case where the user is not moving toward the image forming apparatus 1, and the power-saving state cancellation avoiding area E31 created in step S104 in FIG. 4 does not exist on the user's moving route, the control unit 10 determines that it is necessary to change the settings of the power-saving state canceling area E2. In the example illustrated in FIG. 7A, the user is not moving toward the image forming apparatus 1, and the power-saving state cancellation avoiding area E31 does not exist on the user's moving route. Accordingly, it is determined that the settings of the power-saving state canceling area E2 need to be changed.

If it is determined that the settings of the power-saving state canceling area E2 need to be changed (step S205: YES), the process moves on to the next step S206.

If it is determined that there is no need to change the settings of the power-saving state canceling area E2 (step S205: NO), the process moves on to step S208.

That is, the control unit 10 functions as the second determining unit according to an embodiment of the present invention.

Based on the user's moving route acquired in step S204, the control unit 10 creates a power-saving state cancellation avoiding area E32 (step S206). Specifically, the control unit 10 creates the power-saving state cancellation avoiding area E32 having such a width as to allow the user to pass therethrough along the line extended from the user's moving route (see FIG. 7B).

Figure 7B:
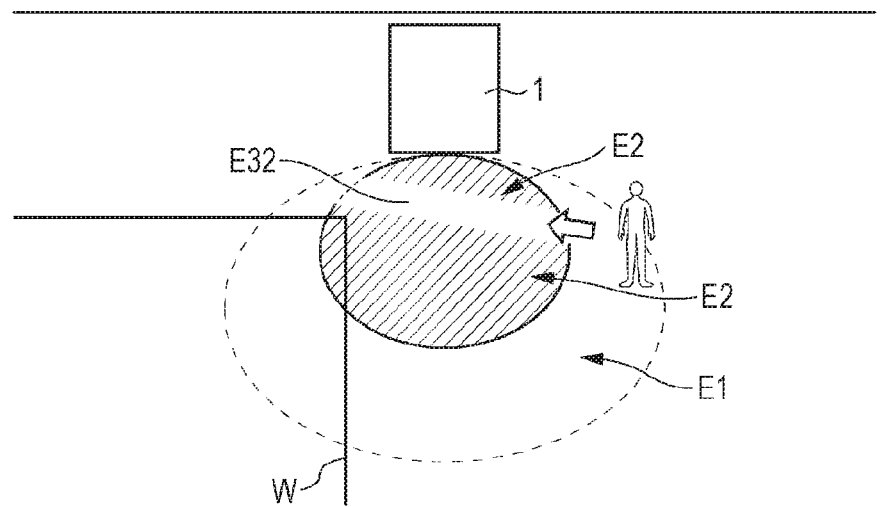

Based on the power-saving state cancellation avoiding area E32 created in step S206, the control unit 10 changes the settings of the power-saving state canceling area E2 (step S207) In this embodiment, a change from the power-saving state cancellation avoiding area E31 to the power-saving state cancellation avoiding area E32 is made, as shown in FIG. 7B.

That is, the control unit 10 functions as the first changing unit according to an embodiment of the present invention.

After determining in step S205 that there is no need to change the settings of the power-saving state canceling area E2, or after changing the settings of the power-saving state canceling area E2 in step S207, the control unit 10 controls the light irradiation unit 80 to irradiate the power-saving state canceling area E2 with a color image indicating that the current area is the power-saving state canceling area E2 (step S208). At this point, the control unit 10 irradiates the power-saving state canceling area E2 minus the power-saving state cancellation avoiding area E32.

The control unit 10 then determines whether entrance of the user into the power-saving state canceling area E2 has been sensed by the human body sensing unit 70 (step S209).

If the control unit 10 determines that entrance of the user has been sensed (step S209: YES), the process moves on to step S211.

If the control unit 10 determines that entrance of the user has not been sensed (step S209: NO), the process moves on to the next step S210.

The control unit 10 then determines whether the user whose entrance into the human sensing area E1 was sensed in step S203 has moved out of the human sensing area E1 (step S210).

If the control unit 10 determines that the user has moved out of the human sensing area E1 (step S210: YES), the process moves on to step S203, and the control unit 10 again determines whether entrance of a user into the human sensing area E1 has been sensed.

If the control unit 10 determines that the user has not moved out of the human sensing area E1 (step S210: NO), on the other hand, the process moves on to step S209, and the control unit 10 again determines whether entrance of the user into the power-saving state canceling area E2 has been sensed.

If the control unit 10 determines in step S209 that entrance of the user into the power-saving state canceling area E2 has been sensed, the control unit 10 cancels the power saving state of the image forming apparatus 1 (step S211).

The control unit 10 then controls the light irradiation unit 80 to suspend the irradiation of the power-saving state canceling area E2 with the color image (step S212).

The control unit 10 then determines whether the user whose entrance into the human sensing area E1 was sensed in step S203 has moved out of the human sensing area E1 (step S213).

If the control unit 10 determines that the user has moved out of the human sensing area E1 (step S213: YES), the process moves on to step S203, and the control unit 10 again determines whether entrance of a user into the human sensing area E1 has been sensed.

If the control unit 10 determines that the user has not moved out of the human sensing area E1 (step S213: NO), the procedure of step S213 is repeated until the control unit 10 determines that the user has moved out of the human sensing area E1.

As described above, the image forming apparatus 1 according to this embodiment includes: a sensing unit (the human body sensing unit 70) that senses a user and an obstacle that blocks the user's passage, and measures the positions of the sensed user and the sensed obstacle; a power-saving state canceling unit (the control unit 10) that cancels a power saving state when the sensing unit senses entrance of a user into the power-saving state canceling area E2 that causes cancellation of the power saving state when a user enters the power-saving state canceling area E2; a first determining unit (the control unit 10) that determines whether the power-saving state cancellation avoiding area E31 that does not cause cancellation of the power saving state is necessary in the power-saving state canceling area E2 based on the obstacle's position measured by the sensing unit when the obstacle is sensed by the sensing unit; and a creating unit (the control unit 10) that creates the power-saving state cancellation avoiding area E31 when the first determining unit determines that the power-saving state cancellation avoiding area E31 is necessary.

Accordingly, with the image forming apparatus 1 according to this embodiment, it is possible to secure an area through which a user not using the image forming apparatus 1 can pass while avoiding the power-saving state canceling area E2, regardless of the installation location of the image forming apparatus 1. Thus, unintended cancellation of a power saving state can be restricted, and energy saving can be realized.

The image forming apparatus 1 according to this embodiment further includes: an irradiating unit (the light irradiation unit 80) that emits light; and an irradiation control unit (the control unit 10) that causes the irradiating unit to irradiate the power-saving state canceling area E2 when the sensing unit senses entrance of a user into the human sensing area E1 in which users are sensed. The irradiation control unit also irradiates the power-saving state canceling area E2 minus the power-saving state cancellation avoiding area.

Accordingly, with the image forming apparatus 1 according to this embodiment, the power-saving state canceling area E2 can be made visible to users. Thus, unintended cancellation of a power saving state can be more certainly restricted.

The image forming apparatus 1 according to this embodiment further includes: an acquiring unit (the control unit 10) that acquires the moving route of a user based on the user's position continuously measured by the sensing unit when the user is sensed by the sensing unit; a second determining unit (the control unit 10) that determines whether it is necessary to change the power-saving state cancellation avoiding area E31 based on the moving route acquired by the acquiring unit; and a first changing unit (the control unit 10) that changes the power-saving state cancellation avoiding area E31 when the second determining unit determines that it is necessary to change the power-saving state cancellation avoiding area E31.

Accordingly, with the image forming apparatus 1 according to this embodiment, the power-saving state cancellation avoiding area can be automatically changed with movement of a user. Thus, the shortest route for a user not using the image forming apparatus 1 can be presented.

Although an embodiment of the present invention has been described in detail, the present invention is not limited to the above described embodiment, and changes may be made to the embodiment without departing from the scope of the invention.

First Modification

Figure 8:
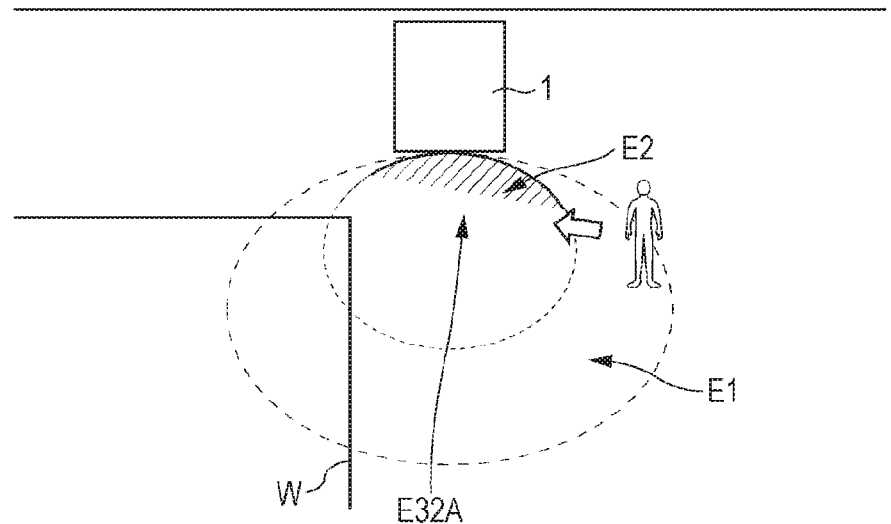
FIG. 8 is a diagram showing an example where a power-saving state cancellation avoiding area is created in a wider area than that in the example shown in FIGS. 7A and 7B.

For example, in the example illustrated in FIG. 8, a power-saving state cancellation avoiding area E32A differs from the power-saving state cancellation avoiding area E32 of the above embodiment in that being wider on the side farther from the image forming apparatus 1. For ease of explanation, the same components as those of the above embodiment are denoted by the same reference numerals as those used in the above embodiment, and detailed explanation of them will not be provided.

As specifically shown in FIG. 8, in a first modification, the power-saving state cancellation avoiding area E32A created based on a user's moving route is designed to include all the area on the side farther from the image forming apparatus 1 than the power-saving state cancellation avoiding area E32 created on the line extended from a moving route in the above embodiment.

As described above, with the image forming apparatus 1 according to the first modification, the first changing unit changes the power-saving state cancellation avoiding area E32 so as to include all the area on the side farther from the apparatus than the line extended from the user's moving route. Accordingly, the user can pass through the power-saving state cancellation avoiding area with ease, and be prevented from stepping into the power-saving state cancellation avoiding area by tripping or being thrown off balance. Thus, unintended cancellation of a power saving state can be restricted.

Second Modification

Figure 9:
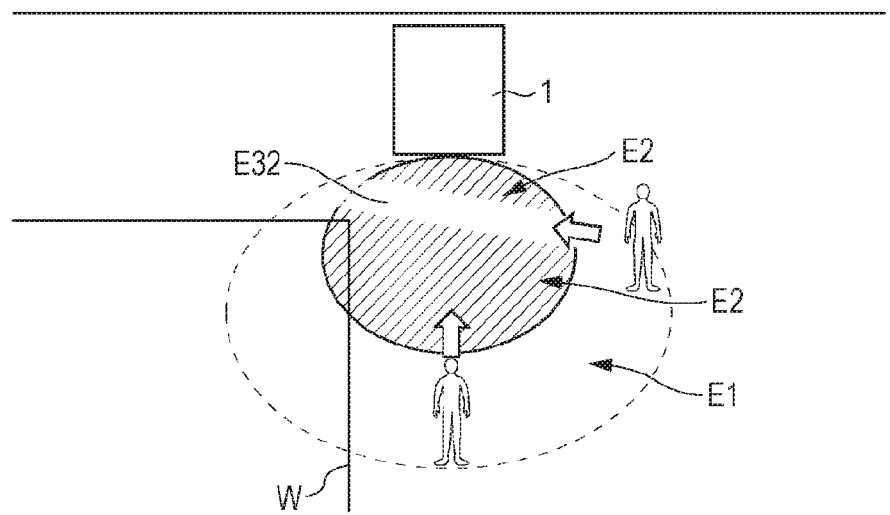
FIG. 9 is a diagram showing an example where the power-saving state canceling area shown in FIG. 7B is redefined as another user approaches in the situation illustrated in FIG. 8.

The example illustrated in FIG. 9 differs from the first modification in that the power-saving state canceling area E2 of the above embodiment is redefined when another user approaches in the situation of the first modification. For ease of explanation, the same components as those of the above embodiment are denoted by the same reference numerals as those used in the above embodiment, and detailed explanation of them will not be provided.

Specifically, in a second modification, when another user is sensed by the human body sensing unit 70, the control unit 10 first determines whether the other user is moving toward the image forming apparatus 1 based on the moving route of the other user.

That is, the control unit 10 functions as the third determining unit according to an embodiment of the present invention.

If the control unit 10 determines that the other user is moving toward the image forming apparatus 1, the control unit 10 redefines the power-saving state canceling area E2 by changing the power-saving state canceling area E2 from the state in which the power-saving state cancellation avoiding area E32A of the first modification is created (see FIG. 8) to a state in which the power-saving state cancellation avoiding area E32 of the above embodiment is created only along the line extended from the moving route of the user (see FIG. 7B), as shown in FIG. 9.

As described above, the image forming apparatus 1 according to the second modification further includes a third determining unit (the control unit 10) that determines whether another user is moving toward the apparatus based on the other user's moving route acquired by the acquiring unit when the other user is sensed by the sensing unit. If the third determining unit determines that the other user is moving toward the apparatus, the first changing unit changes the power-saving state cancellation avoiding area E32A to a state in which the power-saving state cancellation avoiding area is created only along the line extended from the user's moving route.

Accordingly, with the image forming apparatus 1 according to the second modification, the power-saving state canceling area E2 can be changed to an area of an appropriate width as another user who intends to use the apparatus approaches, even if the power-saving state cancellation avoiding area is designed to have a great width. Thus, when the power saving state needs to be canceled for a user who intends to use the apparatus, the power saving state can be canceled as usual, and appropriate power saving control can be performed.

Third Modification

Figure 10A:
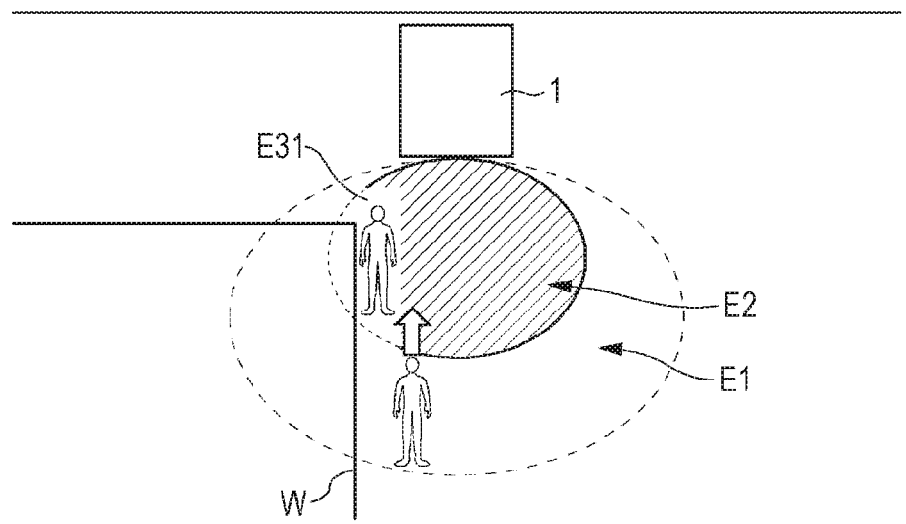
FIGS. 10A and 10B are diagrams showing an example where the power-saving state cancellation avoiding area is widened as another user approaches in the situation illustrated in FIG. 5C.
Figure 10B:
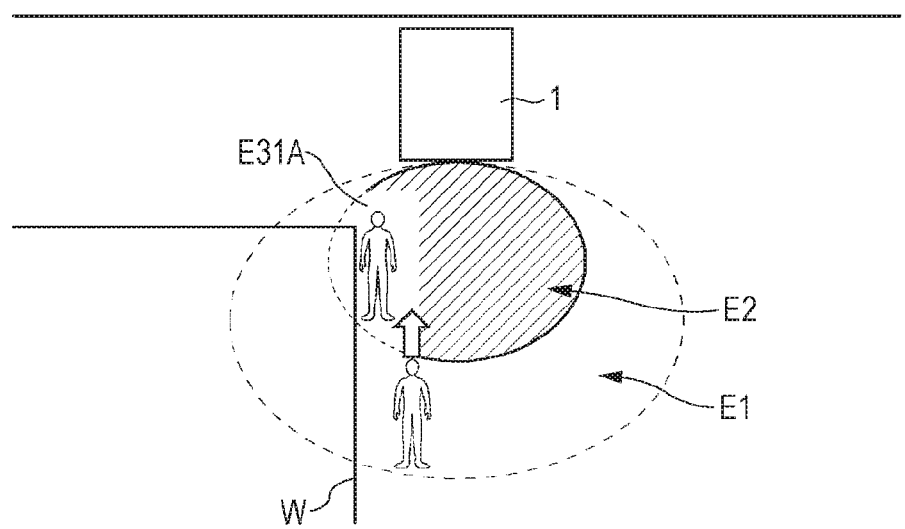

The example illustrated in FIGS. 10A and 10B differs from the above embodiment in that the power-saving state cancellation avoiding area E31 is widened when another user approaches in the situation of the above embodiment. For ease of explanation, the same components as those of the above embodiment are denoted by the same reference numerals as those used in the above embodiment, and detailed explanation of them will not be provided.

As specifically shown in FIGS. 10A and 10B, in a third modification, if a user is sensed in the power-saving state cancellation avoiding area E31 (see FIG. 7A) created according to the above embodiment, and another user is sensed in the human sensing area E1 (see FIG. 10A), the control unit 10 changes the power-saving state cancellation avoiding area E31 to a wider power-saving state cancellation avoiding area E31A (see FIG. 10B).

That is, the control unit 10 functions as the second changing unit according to an embodiment of the present invention.

As described above, the image forming apparatus 1 according to the third modification further includes a second changing unit (the control unit 10) that changes the power-saving state cancellation avoiding area E31 to an area of a greater width when a user is sensed by the sensing unit in the power-saving state cancellation avoiding area E31 created by the creating unit, and another user is sensed by the sensing unit. Accordingly, two or more users can pass through the power-saving state cancellation avoiding area at the same time, and the standby time unnecessary for users who are passing by but do not intend to use the apparatus can be shortened.

Fourth Modification

The example illustrated in FIGS. 11A through 11C and FIG. 12 differs from the above embodiment in that a power-saving state canceling area E2A of another image forming apparatus 1A exists in the power-saving state canceling area E2 of the image forming apparatus 1. For ease of explanation, the same components as those of the above embodiment are denoted by the same reference numerals as those used in the above embodiment, and detailed explanation of them will not be provided.

Figure 11A:
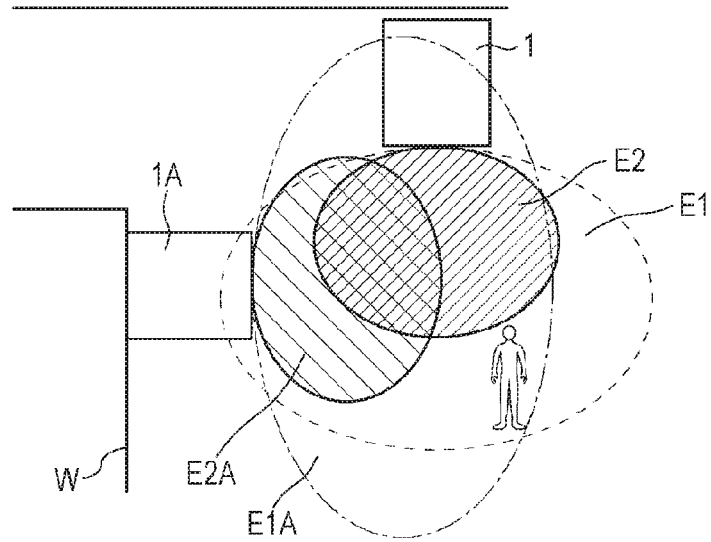
FIGS. 11A through 11C are diagrams showing an example where a power-saving state cancellation avoiding area is created along the intermediate position between two image forming apparatuses.

As specifically shown in FIG. 11A, in a fourth modification, the power-saving state canceling area E2 of the image forming apparatus 1 and the power-saving state canceling area E2A of the other image forming apparatus 1A overlap each other, and block a user's passage. The structure of the other image forming apparatus 1A is the same as the structure of the image forming apparatus 1, and therefore, will not be described in detail.

Referring now to FIGS. 11A through 11C and FIG. 12, the process to be performed when the image forming apparatus 1 according to the fourth modification is powered on is described.

First, the control unit 10 controls the human body sensing unit 70 to determine whether an obstacle exists in the human sensing area E1 of the image forming apparatus 1 (step S301). Here, an obstacle is an object that blocks a user's passage, and may be another image forming apparatus or a wall, for example. In this modification, another image forming apparatus 1A that blocks a user's passage exists in the human sensing area E1 as shown in FIG. 11A, and therefore, it is determined that there exists an obstacle.

If it is determined that there exists an obstacle (step S301: YES), the process moves on to the next step S302.

If it is determined that there are no obstacles (step S301: NO), on the other hand, the process comes to an end.

The control unit 10 then controls the human body sensing unit 70 to determine whether the other image forming apparatus 1A exists in the human sensing area E1 of the image forming apparatus 1 (step S302). In this modification, the other image forming apparatus 1A exists in the human sensing area E1 as shown in FIG. 11A, and therefore, it is determined that there exists the other image forming apparatus 1A.

If it is determined that there exists the other image forming apparatus 1A (step S302: YES), the process moves on to step S307.

If it is determined that the other image forming apparatus 1A does not exist (step S302: NO), on the other hand, it is determined that there exists an obstacle other than the other image forming apparatus 1A, and the process moves on to the next step S303.

The procedures of steps S303 through S306 are the same as the procedures of steps S102 through S105 in FIG. 4 showing the process to be performed when the image forming apparatus 1 according to the above embodiment is powered on, and therefore, are not described herein.

If the control unit 10 determines in step S302 that the other image forming apparatus 1A exists in the human sensing area E1, the control unit 10 controls the human body sensing unit 70 to measure the position of the other image forming apparatus 1A (step S307).

The control unit 10 then transmits the information about the relative position of the apparatus to the other image forming apparatus 1A via the communication unit 60 (step S308).

The control unit 10 then receives the information about the relative positions of a human sensing area E1A and the power-saving state canceling area E2A transmitted from the other image forming apparatus 1A via the communication unit 60 (step S309).

Based on the information about the relative position of the power-saving state canceling area E2A of the other image forming apparatus 1A received in step S309, the control unit 10 determines whether there is an area through which a user can pass between the power-saving state canceling area E2 of the image forming apparatus 1 and the power-saving state canceling area E2A of the other image forming apparatus 1A (step S310). In this modification, the power-saving state canceling area E2 of the image forming apparatus 1 and the power-saving state canceling area E2A of the other image forming apparatus 1A overlap each other, and therefore, it is determined that there is not an area through which a user can pass.

If it is determined that there is an area through which a user can pass (step S310: YES), the process comes to an end.

If it is determined that there is not an area through which a user can pass (step S310: NO), it is determined that a power-saving state cancellation avoiding area E33 is necessary, and the process moves on to the next step S311.

Figure 11B:
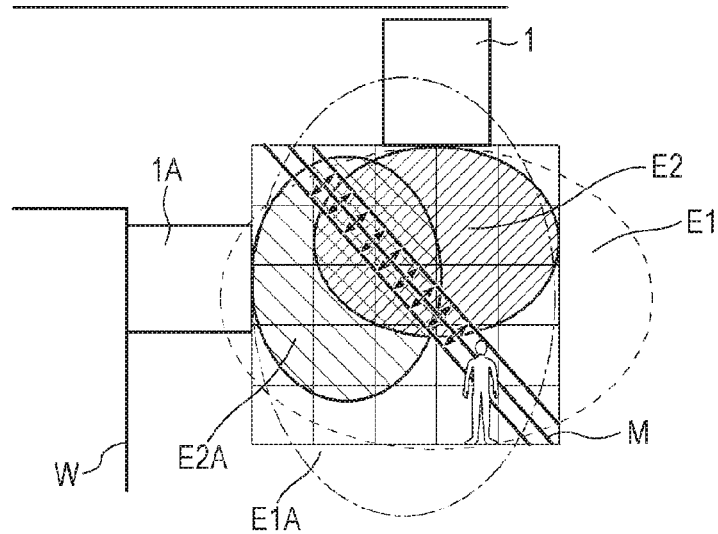

Based on the information about the relative position of the power-saving state canceling area E2A of the other image forming apparatus 1A received in step S309, the control unit 10 calculates the intermediate position between the image forming apparatus 1 and the other image forming apparatus 1A (step S311). In this modification, the intermediate position M between the image forming apparatus 1 and the other image forming apparatus 1A is calculated, as shown in FIG. 11B.

Figure 11C:
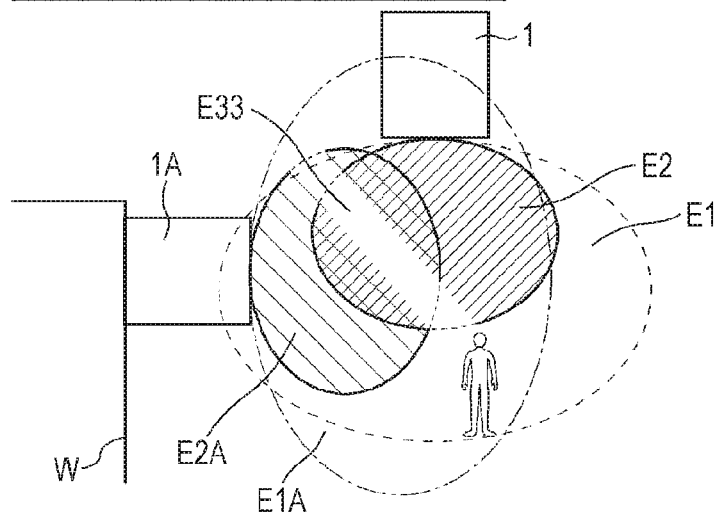
Figure 12:
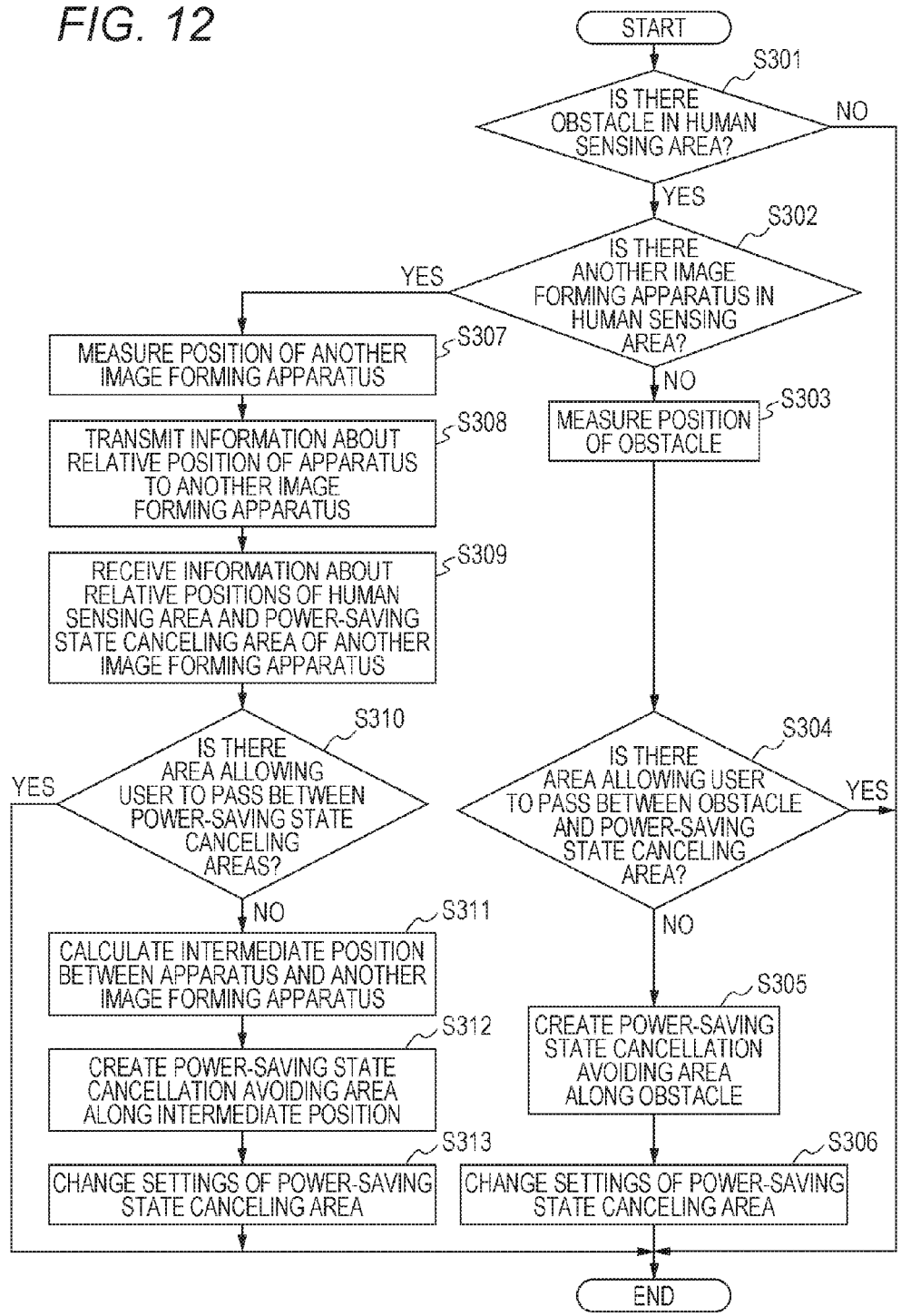

Based on the intermediate position M calculated in step S311, the control unit 10 creates the power-saving state cancellation avoiding area E33 (step S312). As shown in FIGS. 11B and 11C, the power-saving state cancellation avoiding area E33 is created along the intermediate position M, and has such a width as to allow a user to pass therethrough.

Based on the power-saving state cancellation avoiding area E33 created in step S312, the control unit 10 changes the settings of the power-saving state canceling area E2 (step S313). At this point, the control unit 10 transmits the information about the relative position of the power-saving state cancellation avoiding area E33 to the other image forming apparatus 1A via the communication unit 60. With this, the settings of the power-saving state canceling area E2A is also changed in the other image forming apparatus 1A based on the power-saving state cancellation avoiding area E33.

Figure 13:
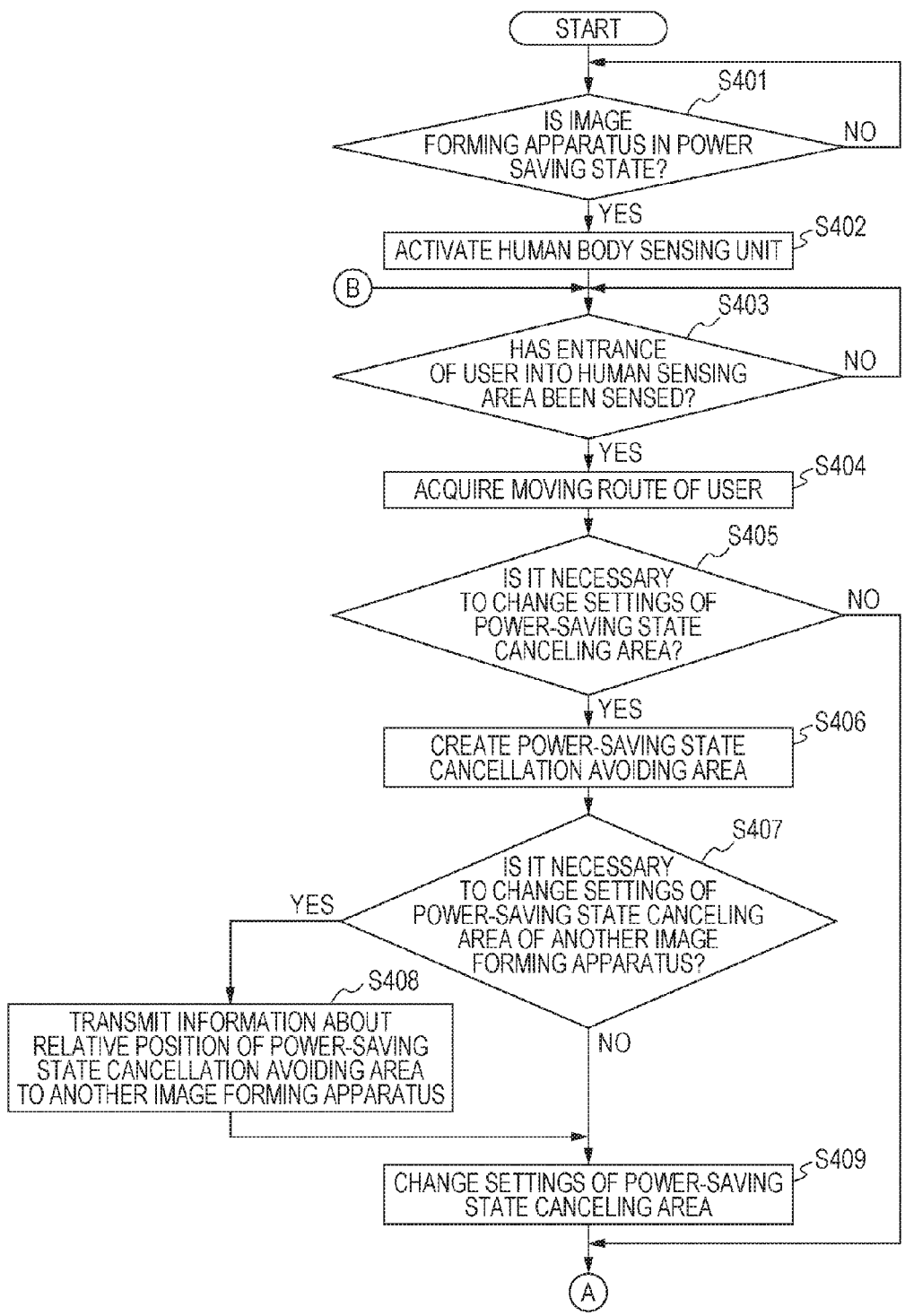
FIG. 13 is a flowchart showing the process to be performed when the image forming apparatus according to the fourth modification is actually activated.
Figure 14:
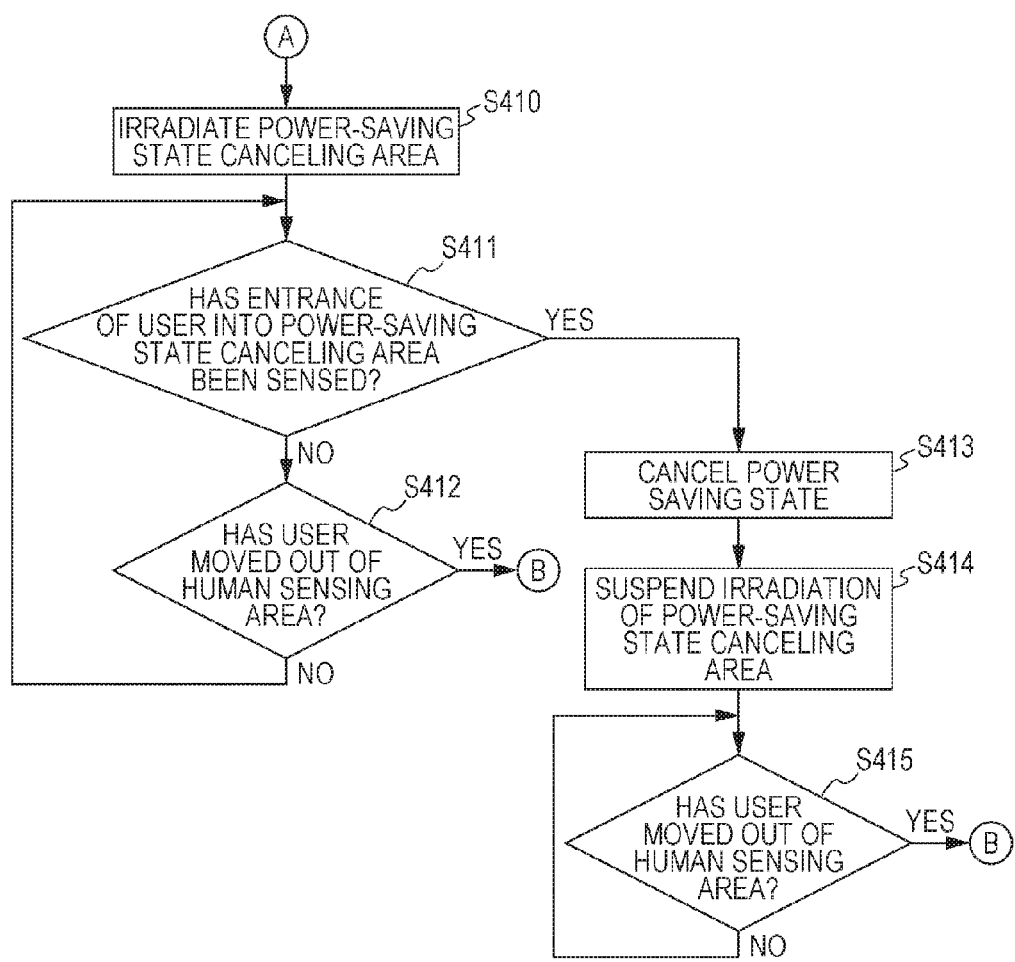
FIG. 14 is a flowchart showing the process to be performed when the image forming apparatus according to the fourth modification is actually activated.
Figure 15:
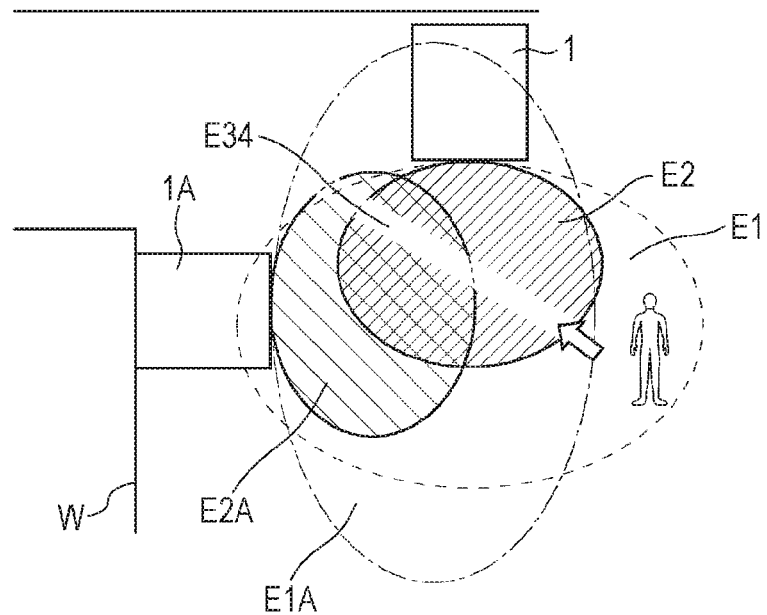
FIG. 15 is a diagram showing an example where a power-saving state cancellation avoiding area is created on a user's moving route.

Referring now to FIGS. 13 through 15, the process to be performed when the image forming apparatus 1 according to the fourth modification is actually activated is described.

The procedures of steps S401 through S404 are the same as the procedures of steps S201 through S204 in FIG. 6 showing the process to be performed when the image forming apparatus 1 according to the above embodiment is actually activated, and therefore, are not described herein.

Based on the user's moving route acquired in step S404, the control unit 10 determines whether it is necessary to change the settings of the power-saving state canceling area E2, or to change the power-saving state cancellation avoiding area E33 (step S405). Specifically, in a case where the user is not moving toward the image forming apparatus 1, and the power-saving state cancellation avoiding area E31 created in step S305 in FIG. 12 or the power-saving state cancellation avoiding area E33 created in step S312 does not exist on the user's moving route, the control unit 10 determines that it is necessary to change the settings of the power-saving state canceling area E2. In the example illustrated in FIG. 15, the user is not moving toward the image forming apparatus 1, and the power-saving state cancellation avoiding area E33 does not exist on the user's moving route. Accordingly, it is determined that the settings of the power-saving state canceling area E2 need to be changed.

If it is determined that the settings of the power-saving state canceling area E2 need to be changed (step S405: YES), the process moves on to the next step S406.

If it is determined that there is no need to change the settings of the power-saving state canceling area E2 (step S405: NO), the process moves on to step S410.

Based on the user's moving route acquired in step S404, the control unit 10 creates a power-saving state cancellation avoiding area E34 (step S406). Specifically, the control unit 10 creates the power-saving state cancellation avoiding area E34 having such a width as to allow the user to pass therethrough along the line extended from the user's moving route (see FIG. 15).

Based on the user's moving route acquired in step S404, the control unit 10 determines whether it is necessary to change the settings of the power-saving state canceling area E2A of the other image forming apparatus 1A (step S407). Specifically, if the power-saving state cancellation avoiding area E34 created in step S406 and the power-saving state canceling area E2A overlap each other, the control unit 10 determines that the settings of the power-saving state canceling area E2A need to be changed. In the example illustrated in FIG. 15, the power-saving state cancellation avoiding area E34 and the power-saving state canceling area E2A overlap each other, and therefore, it is determined that the settings of the power-saving state canceling area E2A need to be changed.

If it is determined that the settings of the power-saving state canceling area E2A need to be changed (step S407: YES), the process moves on to the next step S408.

If it is determined that there is no need to change the settings of the power-saving state canceling area E2A (step S407: NO), the process moves on to step S409.

The control unit 10 then transmits the information about the relative position of the power-saving state cancellation avoiding area E34 to the other image forming apparatus 1A via the communication unit 60 (step S408).

After determining in step S407 that there is no need to change the settings of the power-saving state canceling area E2A, or after transmitting the information about the relative position of the power-saving state cancellation avoiding area E34 to the other image forming apparatus 1A in step S408, the control unit 10 changes the settings of the power-saving state canceling area E2 based on the power-saving state cancellation avoiding area E34 created in step S406 (step S409). In the case where the information about the relative position of the power-saving state cancellation avoiding area E34 is transmitted to the other image forming apparatus 1A in step S408, the settings of the power-saving state canceling area E2A are also changed in the other image forming apparatus 1A based on the power-saving state cancellation avoiding area E34.

The procedure of step S409 may be carried out prior to the procedure of step S407.

After determining in step S405 that there is no need to change the settings of the power-saving state canceling area E2, or after changing the settings of the power-saving state canceling area E2 in step S409, the control unit 10 controls the light irradiation unit 80 to irradiate the power-saving state canceling area E2 with a color image indicating that the current area is the power-saving state canceling area E2 (step S410). In the case where the settings of the power-saving state canceling area E2A are changed in step S409, the power-saving state canceling area E2A is also irradiated with a color image indicating that the current area is the power-saving state canceling area E2A in the other image forming apparatus 1A.

The procedures of steps S411 through S415 are the same as the procedures of steps S208 through S213 in FIG. 6, and therefore, are not described herein.

As described above, in the image forming apparatus 1 according to the fourth modification, the sensing unit senses the other image forming apparatus 1A, and measures the position of the sensed other image forming apparatus 1A. The image forming apparatus 1 according to the fourth modification further includes the communication unit 60 that transmits the information about the position of the apparatus to the other image forming apparatus 1A, and receives the information about the positions of the human sensing area E1A and the power-saving state canceling area E2A transmitted from the other image forming apparatus 1A. Based on the information about the position of the power-saving state canceling area E2A of the other image forming apparatus 1A received by the communication unit 60, the first determining unit determines whether the power-saving state cancellation avoiding area E33 is necessary in the power-saving state canceling area E2 of the apparatus. The communication unit 60 also transmits the information created by the creating unit about the position of the power-saving state cancellation avoiding area E33 to the other image forming apparatus 1A.

Accordingly, with the image forming apparatus 1 according to the fourth modification, it is possible to secure an area through which a user who does not intend to use the image forming apparatus 1 can pass while avoiding the power-saving state canceling area, even if the user's passage is blocked because the power-saving state canceling areas of image forming apparatuses overlap each other. Thus, unintended cancellation of a power saving state can be restricted, and energy saving can be realized.

The image forming apparatus 1 according to the fourth modification further includes: an acquiring unit that acquires the moving route of a user based on the user's position continuously measured by the sensing unit when the user is sensed by the sensing unit; a second determining unit that determines whether it is necessary to change the power-saving state cancellation avoiding area E33 based on the moving route acquired by the acquiring unit; and a first changing unit that changes the power-saving state cancellation avoiding area E33 when the second determining unit determines that it is necessary to change the power-saving state cancellation avoiding area E33. The communication unit 60 also transmits the information created by the first changing unit about the position of the power-saving state cancellation avoiding area E34 to the other image forming apparatus 1A.

Accordingly, with the image forming apparatus 1 according to the fourth modification, the power-saving state cancellation avoiding area can be automatically changed with movement of a user, even if the user's passage is blocked because the power-saving state canceling areas of image forming apparatuses overlap each other. Thus, the shortest route for a user who does not intend to use the image forming apparatus 1 can be presented.

Fifth Modification

Figure 16:
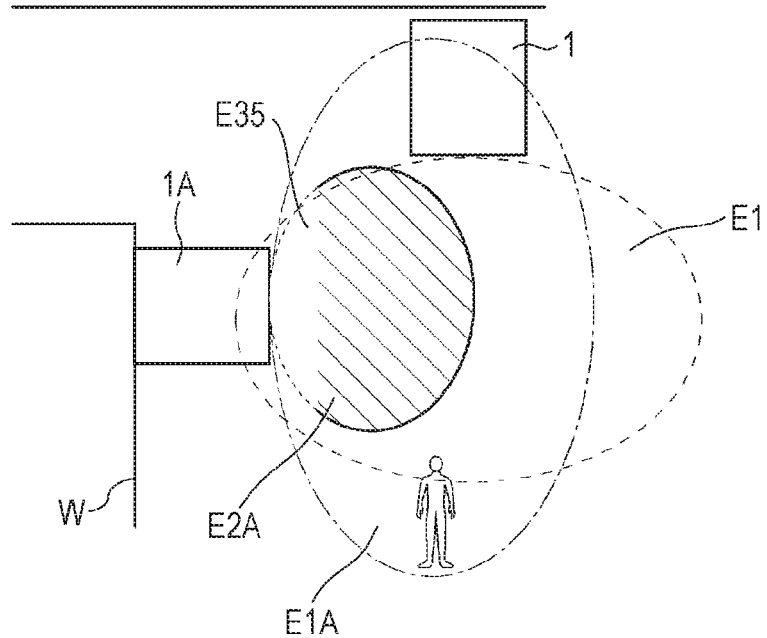
FIG. 16 is a diagram showing an example where only one image forming apparatus irradiates its own power-saving state canceling area.

The example illustrated in FIG. 16 differs from the fourth modification in that, when a predetermined condition is satisfied, only one image forming apparatus irradiates its own power-saving state canceling area. For ease of explanation, the same components as those of the above embodiment are denoted by the same reference numerals as those used in the above embodiment, and detailed explanation of them will not be provided.

As specifically shown in FIG. 16, in a fifth modification, the control unit 10 first determines whether there exists an area through which a user can pass within an area that is included the human sensing area E1A of the apparatus (the other image forming apparatus 1A in this case) but is not included in the power-saving state canceling area E2 of any of the other image forming apparatuses (the image forming apparatus 1 in this case) when the user enters the human sensing area E1A of the other image forming apparatus 1A.

That is, the control unit 10 functions as the fourth determining unit according to an embodiment of the present invention.

If it is determined that there exists an area through which the user can pass, the control unit 10 creates a power-saving state cancellation avoiding area E35 in the power-saving state canceling area E2A of the other image forming apparatus 1A.

If the created power-saving state cancellation avoiding area E35 is also located within the human sensing area E1 of the other image forming apparatus (the image forming apparatus 1), the image forming apparatus 1 does not irradiate its own power-saving state canceling area E2 even when the user enters the power-saving state cancellation avoiding area E35 included in the human sensing area E1. With this, further energy saving can be realized.

As described above, the image forming apparatus 1 according to the fifth modification further includes a fourth determining unit (the control unit 10) that determines whether there exists an area through which a user can pass within an area that is included in the human sensing area of the apparatus but is not included in the power-saving state canceling area of another image forming apparatus. If the fourth determining unit determines that there exists an area through which a user can pass, the creating unit creates the power-saving state cancellation avoiding area E35 in the power-saving state canceling area of the apparatus.

Accordingly, with the image forming apparatus 1 according to the fifth modification, it is possible to secure an area through which a user who does not intend to use the image forming apparatus 1 can pass while avoiding the power-saving state canceling area, even if the user's passage is blocked because the power-saving state canceling areas of image forming apparatuses overlap each other. Thus, unintended cancellation of a power saving state can be restricted, and energy saving can be realized.

Other Modifications

In the above embodiment, the power-saving state canceling area E2 is irradiated with a color image indicating that the current area is the power-saving state canceling area E2. However, the present invention is not limited to that. That is, the power-saving state canceling area E2 may not be irradiated with a color image. In this case, the light irradiation unit 80 becomes unnecessary. Accordingly, the size and the costs of the image forming apparatus 1 can be reduced.

Even if entrance of a user into the human sensing area E1 is sensed in this case, the power-saving state canceling area E2 is not irradiated with a color image by the light irradiation unit 80. Therefore, the human sensing area E1 does not need to be prepared, either.

Also, in the above described fourth modification, the information about the relative position of the apparatus is transmitted to the other image forming apparatus 1A, and the information about the relative positions of the human sensing area E1A and the power-saving state canceling area E2A is received from the other image forming apparatus 1A. However, the present invention is not limited to that. For example, a GPS sensor or the like may be provided to acquire information about absolute positions, and, instead of the information about relative positions, the information about absolute positions may be used.

The respective modes disclosed in this application can be regarded as methods, programs, and the like. In the case of a method or a program, the "units" in each apparatus should be appropriately read as "procedures" or "steps". Also, the orders of the procedures or the steps are not limited to those specifically disclosed in this application, but may be changed. Some of the procedures or the steps may be collectively carried out, or may be carried out one by one.

Further, changes may be made to the specific structures and the specific operations of the respective devices constituting an image forming apparatus, without departing from the scope of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising:
   a sensing unit configured to sense a user and an obstacle blocking the user's passage, and measure positions of the sensed user and the sensed obstacle;
   a power-saving state canceling unit configured to cancel a power saving state when the sensing unit senses entrance of a user into a power-saving state canceling area, the power-saving state canceling area causing cancellation of the power saving state when a user enters the power-saving state canceling area;
   a first determining unit configured to determine whether a power-saving state cancellation avoiding area not causing cancellation of the power saving state is necessary in the power-saving state canceling area based on an obstacle's position measured by the sensing unit when the obstacle is sensed by the sensing unit; and
   a creating unit configured to create the power-saving state cancellation avoiding area when the first determining unit determines that the power-saving state cancellation avoiding area is necessary.

2. The image forming apparatus according to claim 1, further comprising:
   an irradiating unit configured to emit light; and
   an irradiation control unit configured to cause the irradiating unit to irradiate the power-saving state canceling area when the sensing unit senses entrance of a user into a human sensing area, the human sensing area causing sensing of a user, wherein the irradiation control unit causes the irradiating unit to irradiate the power-saving state canceling area minus the power-saving state cancellation avoiding area.

3. The image forming apparatus according to claim 1, further comprising:
   an acquiring unit configured to acquire a user's moving route based on the user's position continuously measured by the sensing unit when the user is sensed by the sensing unit;
   a second determining unit configured to determine whether it is necessary to change the power-saving state cancellation avoiding area based on the moving route acquired by the acquiring unit; and
   a first changing unit configured to change the power-saving state cancellation avoiding area when the second determining unit determines that it is necessary to change the power-saving state cancellation avoiding area.

4. The image forming apparatus according to claim 3, wherein the first changing unit changes the power-saving state cancellation avoiding area to include all the area on a side farther from the apparatus than a line extended from the user's moving route.

5. The image forming apparatus according to claim 4, further comprising
   a third determining unit configured to determine whether another user is moving toward the apparatus based on the another user's moving route acquired by the acquiring unit when the another user is sensed by the sensing unit,
   wherein, when the third determining unit determines that the another user is moving toward the apparatus, the first changing unit changes the power-saving state cancellation avoiding area to an area formed only along the line extended from the user's moving route.

6. The image forming apparatus according to claim 1, further comprising
   a second changing unit configured to change the power-saving state cancellation avoiding area to a wider area when the sensing unit senses another user after sensing the user in the power-saving state cancellation avoiding area created by the creating unit.

7. The image forming apparatus according to claim 1, wherein
   the sensing unit senses another image forming apparatus, and measures a position of the sensed another image forming apparatus,
   the image forming apparatus further comprises
   a communication unit configured to transmit information about a position of the apparatus to the another image forming apparatus, and receive information about positions of the human sensing area and the power-saving state canceling area transmitted from the another image forming apparatus,
   the first determining unit determines whether the power-saving state cancellation avoiding area is necessary in the power-saving state canceling area of the apparatus based on the information about the position of the power-saving state canceling area of the another image information apparatus, the information having been received by the communication unit, and
   the communication unit transmits information about a position of the power-saving state cancellation avoiding area created by the creating unit to the another image forming apparatus.

8. The image forming apparatus according to claim 7, further comprising:
   an acquiring unit configured to acquire a user's moving route based on the user's position continuously measured by the sensing unit when the user is sensed by the sensing unit;
   a second determining unit configured to determine whether it is necessary to change the power-saving state cancellation avoiding area based on the moving route acquired by the acquiring unit; and
   a first changing unit configured to change the power-saving state cancellation avoiding area when the second determining unit determines that it is necessary to change the power-saving state cancellation avoiding area,
   wherein the communication unit transmits information about a position of the power-saving state cancellation avoiding area changed by the first changing unit to the another image forming apparatus.

9. The image forming apparatus according to claim 7, further comprising
   a fourth determining unit configured to determine whether an area allowing a user to pass therethrough exists in an area, the area being included in the human sensing area of the apparatus and not being included in the power-saving state canceling area of the another image forming apparatus,
   wherein, when the fourth determining unit determines that there exists an area allowing a user to pass therethrough, the creating unit creates the power-saving state cancellation avoiding area in the power-saving state canceling area of the apparatus.

10. A power-saving state control method for an image forming apparatus, comprising:
   the step of canceling a power saving state when a sensing unit senses entrance of a user into a power-saving state canceling area, the sensing unit sensing a user and an obstacle blocking the user's passage, the sensing unit measuring positions of the sensed user and the sensed obstacle, the power-saving state canceling area causing cancellation of the power saving state when a user enters the power-saving state canceling area;
   the step of determining whether a power-saving state cancellation avoiding area not causing cancellation of the power saving state is necessary in the power-saving state canceling area based on an obstacle's position measured by the sensing unit when the obstacle is sensed by the sensing unit; and
   the step of creating the power-saving state cancellation avoiding area when the power-saving state cancellation avoiding area is determined to be necessary.

11. A non-transitory recording medium storing a computer readable program for causing a computer to function as:
   a power-saving state canceling unit configured to cancel a power saving state when entrance of a user into a power-saving state canceling area is sensed by a sensing unit, the sensing unit sensing a user and an obstacle blocking the user's passage, the sensing unit measuring positions of the sensed user and the sensed obstacle, the power-saving state canceling area causing cancellation of the power saving state when a user enters the power-saving state canceling area;
   a first determining unit configured to determine whether a power-saving state cancellation avoiding area not causing cancellation of the power saving state is necessary in the power-saving state canceling area based on an obstacle's position measured by the sensing unit when the obstacle is sensed by the sensing unit; and a creating unit configured to create the power-saving state cancellation avoiding area when the first determining unit determines that the power-saving state cancellation avoiding area is necessary.

* * * * *